United States Patent [19]

Mandello

[11] Patent Number: 4,654,844
[45] Date of Patent: Mar. 31, 1987

[54] BI-DIRECTIONAL COUPLER

[75] Inventor: Mark F. Mandello, Trumbull, Conn.

[73] Assignee: United Technologies Corporation, Hartford, Conn.

[21] Appl. No.: 647,518

[22] Filed: Sep. 4, 1984

[51] Int. Cl.[4] .................. H04J 15/00; H04L 5/00; H04B 9/00

[52] U.S. Cl. .................... 370/32; 455/607; 455/608

[58] Field of Search ............... 455/78, 608, 601, 606, 455/607; 370/32; 375/55, 87

[56] References Cited

U.S. PATENT DOCUMENTS

| 1,970,423 | 8/1934 | Frink | 370/32 |
| 4,001,578 | 1/1977 | Cook et al. | 455/608 |
| 4,006,304 | 2/1977 | Sell | 455/608 |
| 4,090,067 | 5/1978 | Bell, III et al. | 455/608 |
| 4,355,423 | 10/1982 | Theall | 455/608 |

FOREIGN PATENT DOCUMENTS 58-172039  10/1983  Japan ............... 455/607

OTHER PUBLICATIONS

Fulenwider et al–Experimental, Multi-Fiber Optical Cable Conf. 23rd Int. Congress on Elect. Rome, Italy Mar. 1976.

Tuschmann–Non-Feedback Automatic Dupley Transmission Direction Selector–Funkschau–vol. 49, No. 4–pp. 180–181–Feb. 11, 1971.

Yoneda et al.–"Optical Fiber Versatile TX"–Review of the Elec. Comm. Labs. vol. 27, Nos. 11–12–Nov.–Dec. 1979–pp. 936–948.

Ohta et al–"Performance of a Long-Wavelength Fiber Optical Digital" *Conf.* 1981 *Intern. Conf. on Communications*–Denver, Col.–Jun. 14–18, 1981 pp. 380.4/1–5.

*Primary Examiner*—Joseph A. Orsino, Jr.
*Attorney, Agent, or Firm*—Francis J. Maguire, Jr.

[57] ABSTRACT

Circuitry is disclosed for automatically coupling an asynchronous half-duplex bipolar serial data bus to an asynchronous half-duplex unipolar serial data bus by means of extremely simple circuitry.

6 Claims, 7 Drawing Figures

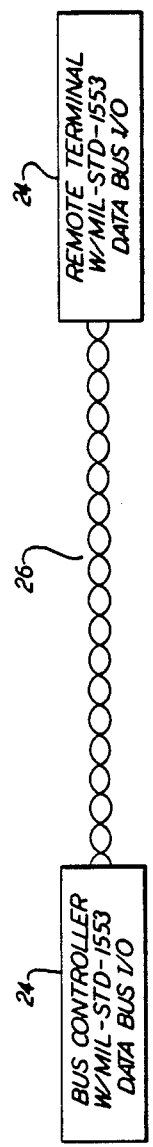
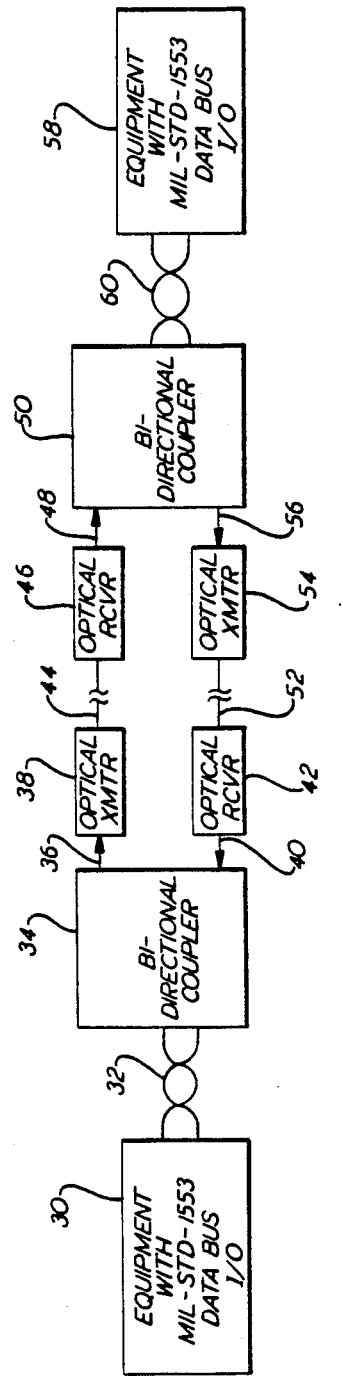
FIG. 2
PRIOR ART
FIG. 3

BI-DIRECTIONAL COUPLER

DESCRIPTION

1. Technical Field

This invention relates to a TTL-optical coupler for use in reducing electromagnetic susceptibility problems for long runs of wires by substituting optical cables. The TTL-optical coupler is used at the interface between the wires and the optical cables.

2. Background Art

Long runs of twisted shielded pair wire are commonly used to link equipment. Such wires are subject to electromagnetic susceptibility and externally generated radiation. One way to avoid this problem is to replace the wires with optical fibers.

If the signal intelligence on the wires is biphase tristate Manchester code, e.g., as per MIL-STD-1553, it will be necessary to convert the tristate signals to a two-state TTL signal for use with an optical transmitter. Similarly, an optical receiver will provide TTL signals for conversion to tristate code.

Prior art couplers used to interface between TTL signals and Manchester coded signals require external control lines or clock signals to operate. This involves a level of complexity which would be desirable to avoid.

DISCLOSURE OF INVENTION

The object of the present invention is to provide a bi-directional coupler for interfacing between two-state TTL signals and tristate biphase Manchester code signals with no external control lines or clock signals and which automatically directs the direction of data flow with a minimum number of components.

According to the coupler of the present invention, the coupler's tristate bus I/O is in a high impedance state until a TTL input signal is presented to the coupler and the bus I/O then outputs the pulses in a tristate format. At the end of the TTL pulse train the coupler's tristate bus I/O returns to a high impedance state. The TTL output remains low until the coupler's tristate bus I/O receives a biphase Manchester code pulse train. At that time the TTL output transmits a two-state TTL pulse train. The coupler automatically permits operation of the coupler in only one direction at a time. If a pulse train is the first to arrive from either direction it will be converted. If, during the conversion process another pulse train from the opposite direction arrives it will be denied conversion access to the coupler.

In further accord with the present invention, the coupler may be configured to respond in the transmit mode to pulses received either at the coupler's tristate bus I/O or at the TTL input for retransmission.

In still further accord with the present invention, the coupler can provide a TTL control signal to control a single optical transceiver for use in single fiber data transmission. The coupler, in this case, can control direction of data flow on the fiber by providing a high state when the TTL output is transmitting pulses due to tristate pulses received at the coupler's tristate bus I/O.

The most important feature of the coupler of the present invention is that it is unique from other methods of TTL-Manchester code conversion in that it requires no external control lines or clock signals to operate. In addition, the coupler automatically directs the direction of data flow with a minimum number of components.

The advantages of the bi-directional coupler of the present invention include the use of a minimum number of inexpensive components which can be packaged with an optical transmitter/receiver set or a transceiver to form a module which can be powered by a single, e.g. five volt, DC supply. The coupler can be used to form a chain of fiber optic links for transmitting data downstream or parallelled to form an optical bus. The circuit can be fabricated on a single hybrid chip for miniaturization. It can be used to operate a single fiber bi-directional link between the coupler and a transceiver. It is fully automatic and requires no control lines or clock signals.

These and other objects, features, and advantages of the present invention will become more apparent in light of the following detailed description of a best mode embodiment thereof, as illustrated in the accompanying drawing.

BRIEF DESCRIPTION OF DRAWINGS

FIG. 2 is an illustration of a bus controller linked to a remote terminal by way of a MIL-STD-1553 bus utilizing a twisted shielded pair of wires for a bus;

FIG. 3 is simplified block diagram illustration of two bi-directional couplers according to the present invention utilized in a system for linking two pieces of equipment according to MIL-STD-1553 using optical fibers in place of a long run of a twisted shielded pair of wires;

BEST MODE FOR CARRYING OUT INVENTION

Figure 1:
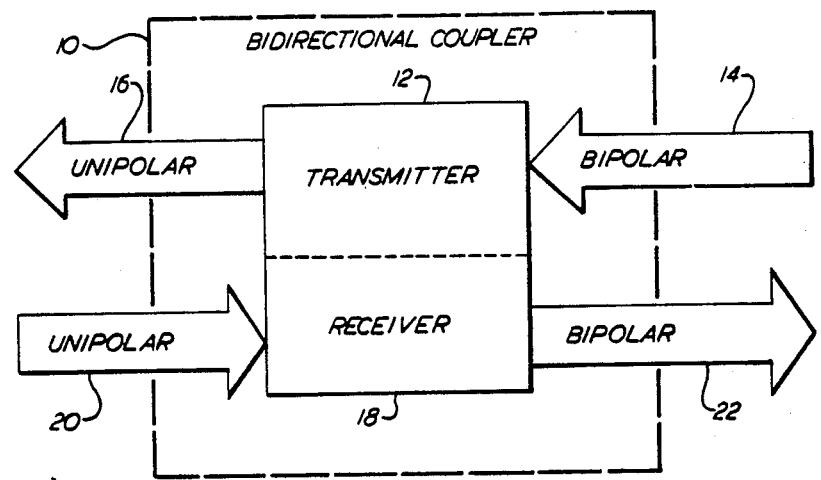
FIG. 1 is a simplified block diagram of the bi-directional coupler of the present invention.

Referring to FIG. 1, a simplified block diagram illustration of the bi-directional coupler 10 according to the present invention is illustrated. A transmitter section 12 receives asynchronous bipolar serial signals on a line 14 which may be tristate biphase Manchester II code according to MIL-STD-1553. The transmitter section 12 converts the signals on the line 14 to asynchronous unipolar serial signals on a line 16 which may be TTL compatible signals.

The coupler 10 also includes a receiver section 18 which is responsive to asynchronous unipolar serial signals on a line 20 which may be of the TTL compatible type. The receiver converts the signals to asynchronous bipolar serial signals on a line 22 which also may be of the tristate biphase Manchester II.

It should be understood that the unipolar "end" of the coupler wherein two ports (i.e., an input and an output port) are shown in FIG. 1 can actually be embodied in a single I/O port for asynchronous communication purposes. Similarly, the bipolar "end" of the coupler can be embodied in a single port. The illustration of FIG. 1 is mainly intended for a conceptional presentation and is not intended to imply that the bipolar inputs and outputs are necessarily independent. Similarly, FIG. 1 shows the transmitter section 12 and the receiver section 18 as distinct sections of the bi-directional coupler 10. It should be understood that some overlapping of the functions and the components that embody those functions may exist in various embodiments of the invention.

The present invention is intended for use in situations in which the distance between pieces of equipment that communicate via lengths of twisted shielded pairs of wires are great. In such cases the electromagnetic susceptibility problems are often intolerable. As shown in FIG. 2, two such pieces of equipment 24 are linked by a shielded twisted pair of wires 26. The particular pieces of equipment in FIG. 2 are shown as having MIL-STD-1553 data bus I/O. Of course, it should be realized that the equipment shown in FIG. 2 need not have been shown as MIL-STD-1553 compatible and the use of the invention is not necessarily restricted to MIL-STD-1553 uses.

The electromagntic susceptibility problems of the prior art as shown in FIG. 2 can be obviated by using optical fibers in lieu of shielded twisted pairs of wires between pieces of equipment. As shown in FIG. 3, a piece of equipment 30, which may be a bus controller, having a MIL-STD-1553 data bus I/O provides tristate biphase Manchester coded signals on a shielded twisted pair of wires 32 to a bi-directional coupler 34 according to the present invention. The bi-directional coupler 34 provides TTL compatible unipolar output signals on a line 36 to an optical transmitter 38 when the equipment 30 is transmitting Manchester code. The bi-directional coupler receives Manchester coded signals on a line 40 from an optical receiver 42 and provides Manchester coded signals on the line 32 to the equipment 30. An optical fiber link 44 links the optical transmitter 38 to an optical receiver 46 which provides TTL compatible signals on a line 48 to a second bi-directional coupler 50 according to the present invention. Another optical link 52 connects the optical receiver 42 to an optical transmitter 54 which receives TTL compatible signals on a line 56 from the bi-directional coupler 50. The bi-directional coupler 50 is linked to a piece of equipment 58 which may be a remote terminal having a MIL-STD-1553 data bus I/O. A shielded twisted pair of wires 60 links the bi-directional coupler 50 to the piece of equipment 58.

The two pieces of equipment 30, 58 shown in FIG. 3 may communicate with one another according to MIL-STD-1553 using tristate Manchester code on the lines 32, 60. Since the optical transmitters 38, 54, and the optical receivers 42, 46 as well as the optical fiber lines 44, 52 are not compatible with tristate signal levels, the bi-directional couplers 34, 50 must convert from Manchester code to TTL compatible code. The converted code may retain its Manchester character except to the extent that it is no longer tristate.

It should be understood that although the bi-directional couplers 34, 50 are each shown interfacing with a transmitter-receiver pair on separate lines, the couplers could as easily interface with individual transceivers on single lines. The utility of such an arrangement will become apparent in light of FIG. 5.

Figure 4:
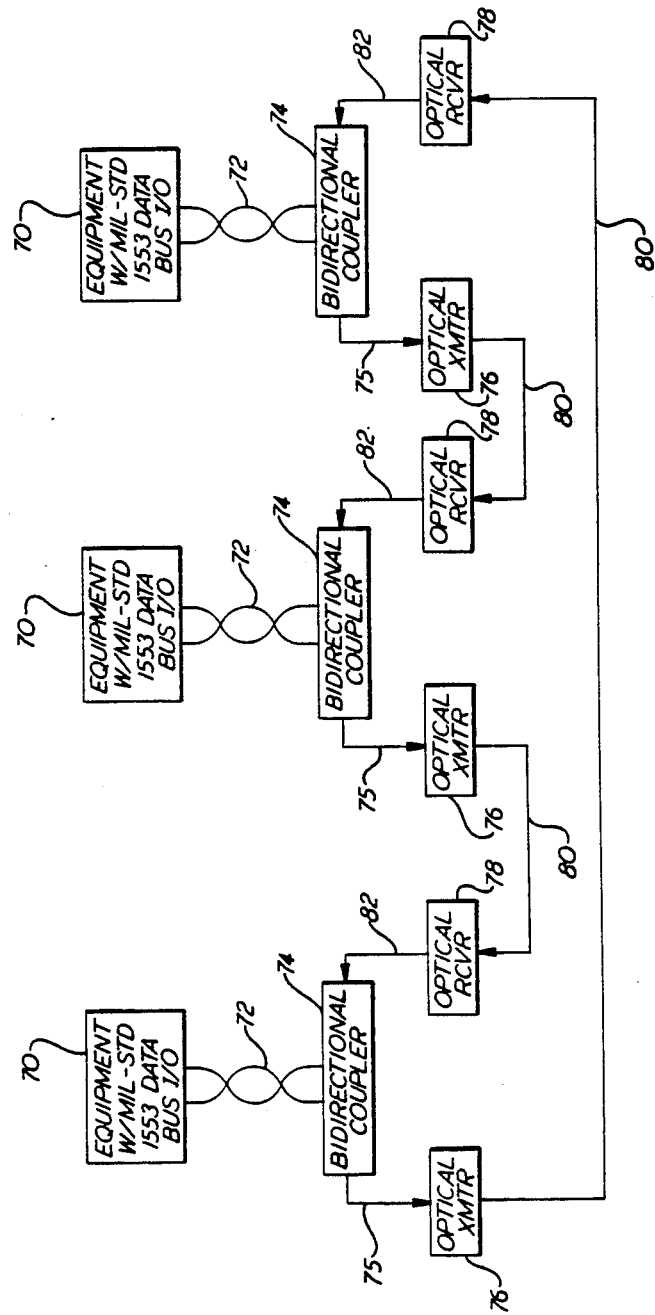
FIG. 4 is a simplified block diagram illustration of a chain of fiber optic links for transmitting data from equipment to equipment using optical fibers and the bi-directional coupler of the present invention.

Although the bi-directional couplers 34, 50 of FIG. 3 are shown in an application in which only two pieces of equipment 30, 58 are interfaced, it should be understood that couplers according to the present invention can be utilized in a closed loop of several pieces of equipment as shown in FIG. 4. The number of pieces of equipment is theoretically unlimited. However, for purposes of MIL-STD-1553 the number of pieces of equipment interfaced on the data bus is restricted to 31. In FIG. 4 three pieces of equipment 70, one or more of which may be a bus controller, are linked via shielded twisted pairs 72 to bi-directional couplers 74. Each bi-directional coupler 74 provides an output signal on a line 75 to an optical transmitter 76. Each optical transmitter provides the optical equivalent of the signal on the line 75 to an optical receiver 78 on a line 80. Each of the bi-directional couplers 74 are configured in such a way as to immediately retransmit any received signals on a line 82 out again on the line 75. In this way, signals are propagated quickly around the loop. A disadvantage of this arrangement is the disablement of the entire loop if a single element goes bad.

Figure 5:
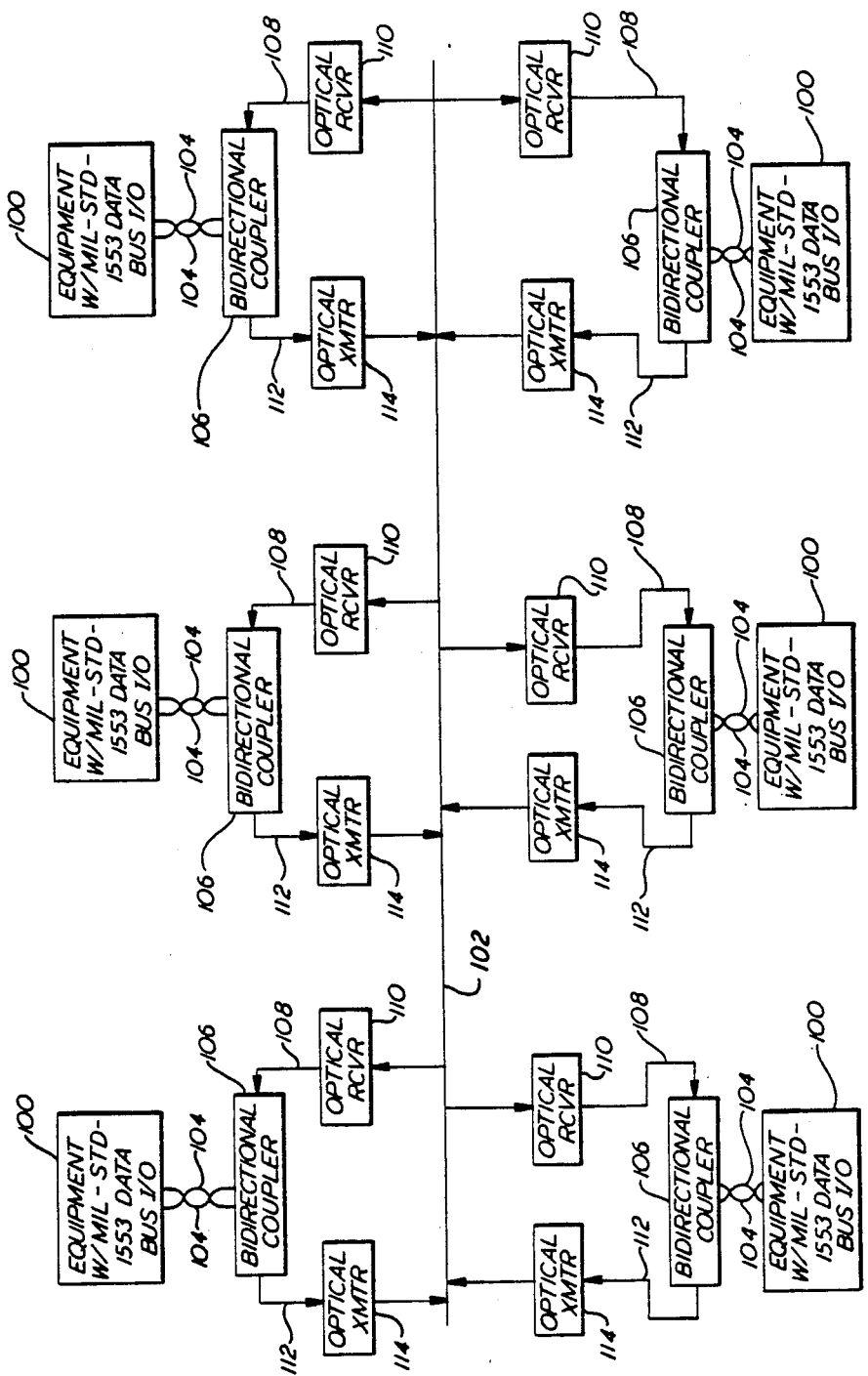
FIG. 5 is a simplified block diagram illustration of an optical bus for parallel interfacing of a number of pieces of equipment utilizing bi-directional couplers according to the present invention.

In FIG. 5 various pieces of equipment 100, one or more of which may assume the role of bus controller, are linked in parallel by a single optical fiber bus 102. This arrangement is superior to that of FIG. 4 in that one or more equipment failures will not disable the other pieces of equipment on the link. Each piece of equipment 100 is connected via shielded twisted pair of wires shown on lines 104 to a bi-directional coupler 106 according to the present invention. Each bi-directional coupler is responsive to TTL compatible signals received on a line 108 from an optical receiver 110. The coupler converts the TTL level to Manchester code which is provided on the lines 104 to the related piece of equipment 100. Each bi-directional coupler 106 is also responsive to Manchester code received on the lines 104 for transmission in TTL compatible form on a line 112 to a related optical transmitter 114. Each optical transmitter 114 provides an equivalent optical pulse train on the bus 102 for immediate transmission to all the other pieces of equipment 101 on the bus 102. It should be understood, that each bi-directional coupler 106 can as easily interface with a single optical transceiver rather than separate transmitters 114 and receivers 110. This is possible in an asynchronous half duplex system in which the bus 102 is controlled by a bus controller (not shown) which only allows one piece of equipment 100 to communicate on the bus 102 at a time. In a case where the transmitter-receiver pairs are replaced by a single transceiver the bi-directional coupler is linked to the transceiver by a single line and the transceiver is linked to the optical bus by a single line. It will be understood that since only one pulse train is allowed on the bus at a time such an arrangement is not only permissible but desirable because of the reduction in the number of lines.

Figure 6:
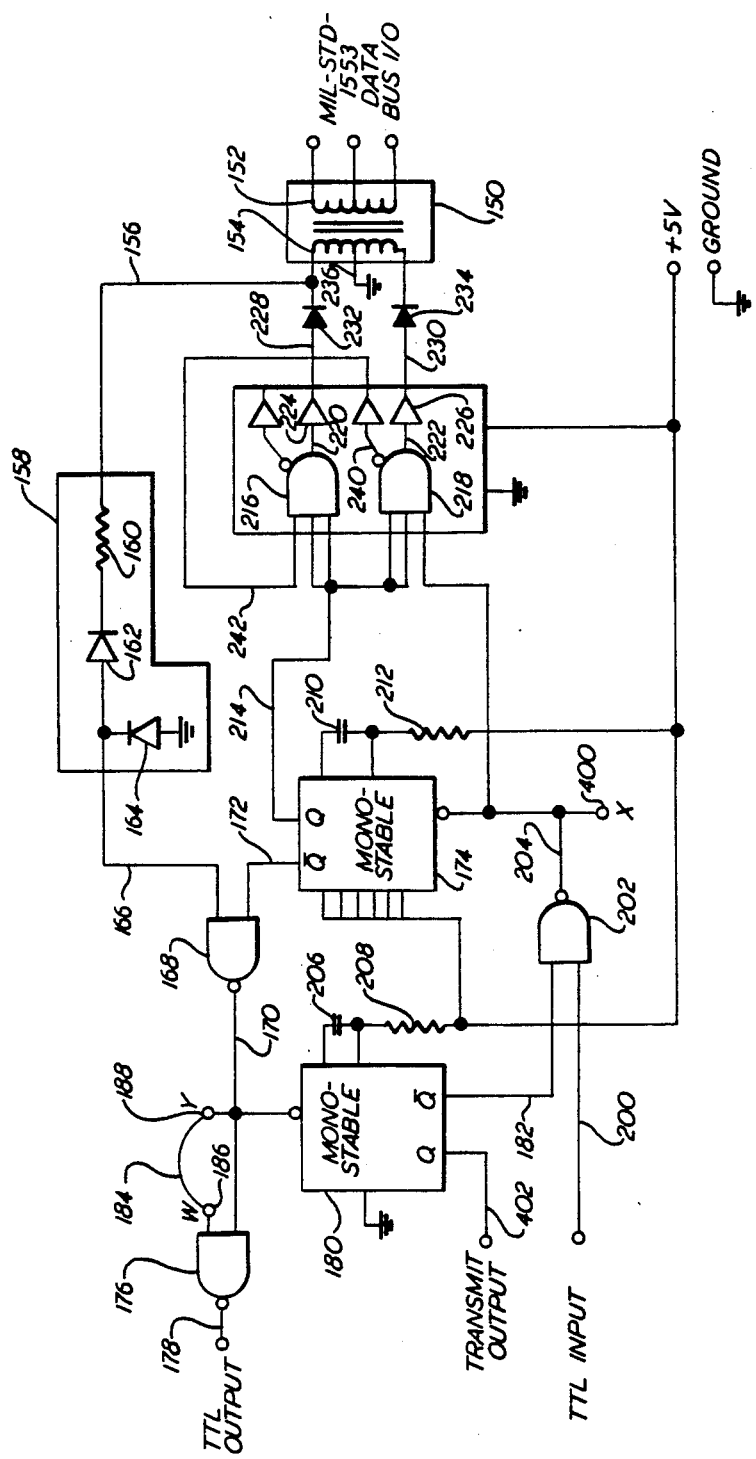
FIG. 6 is a simplified schematic block diagram illustration of the bi-directional coupler according to the present invention.

Referring now to FIG. 6, a simplified block diagram illustration of the bi-directional coupler according to the present invention is shown. A transformer 150 is utilized to interface with a MIL-STD-1553 data bus. In the event that a pulse train is received on the MIL-STD-1553 data bus for transmission and no messages are currently being received by the coupler, the tristate biphase Manchester coded signals appearing at one side of the transformer 152 will be coupled to the other side of the transformer 154 and will be transmitted on a line 156 to a clipper circuit 158 having a resistor 160, a clipping diode 162 and a shunt diode 164. The function of the clipping circuit 158 is to remove the upper half of the Manchester coded pulse train. The resulting unipolar signal on a line 166 is provided to a NAND gate 168 which provides an inverted version of the signal on the line 166 on a line 170 as long as a signal on a line 172 is high, i.e., in the "ON" state, regardless of its polarity. The signal on the line 172 is provided by a monostable 174 having a $\overline{Q}$ output which is used to disable the transmitter section of the bi-directional coupler in the event that a TTL input pulse train has previously been received and is currently being converted to tristate code. The operation of the monostable 174 will be described in more detail below.

The signal on the line 170 is fed into both inputs of a NAND gate 176 which provides a TTL output signal on a line 178 which is an inverted version of the signal on the line 170. The TTL output signal on the line 178 may be used as shown on line 36 of FIG. 3, line 75 of FIG. 4, or line 112 of FIG. 5 to trigger an optical transmitter.

A monostable 180 is triggered by the signal on the line 170 to provide a receiver inhibit signal on a line 182 to be described in more detail below.

A jumper 184 is shown in FIG. 6 between a point "W" 186 and a point "Y" 188 which renders NAND gate 176 into a pure inverter. The jumper 184 is removed in a retransmit mode to be described in more detail below.

A TTL input signal on a line 200 is presented to a NAND gate 202 which permits an inverted version of the input signal on the line 200 to be propagated on a line 204 provided that the signal on the line 182 is high. Thus, NAND gate 202 acts as an inverter as long as the signal on the line 182 is high. If the signal on the line 182 is low the output of NAND gate 202 is always high. The monostable 180 has a capacitor 206 and a resistor 208 associated in a timing circuit which defines the length of time the monostable remains in its triggered state after the appearance and disappearance of its triggering signal on the line 170. In the MIL-STD-1553 context the timing of this circuit is set so that the $\overline{Q}$ output remains low for approximately three microseconds. Assuming that the receiver is not inhibited by a low level signal on the line 182, the TTL input signals on the line 200 will propagate through the NAND gate 202 in inverted form on the line 204 and trigger the monostable 174 thereby disabling the transmitter by providing a low level signal on the line 172. A capacitor 210 and a resistor 212 are part of a timing circuit which is set to return the monostable to its stable state approximately three microseconds after being triggered by the leading edge of the received signal pulse on the line 204. Since the Q output of the monostable 174 on a line 214 is normally at a low level (0), two of the inputs for each of two AND-NAND gates 216, 218 are normally low also. Since both of these inputs to each of the gates 216, 218 are therefore normally zero the AND portions of each of these gates will therefore normally provide low level signals on lines 220, 222. These will be amplified by amplifiers 224, 226 and provided on lines 228, 230 to diodes 232, 234. The diodes 232, 234 are in turn connected to each side of the transformer 150. A center tap 236 is connected to ground.

Assuming that an incoming TTL input pulse is received on the line 200, the output of NAND gate 202 will go low if the coupler is not transmitting. The monostable 174 will change state thereby inhibiting the transmitter and changing the signal level on the line 214 from low to high. Since all three of the inputs to the AND-NAND gate 216 are now high, the AND output on the line 220 goes high, the output on the line 228 goes high, and the diode 232 begins to conduct through winding 154 and center tap 236 to ground. This produces a coupled signal in the winding 152 which represents the first half of a Manchester pulse. After the pulse on the line 200 disappears due to the signal on the line 200 transitioning to logic low, the output on the line 204 will once again return to the high state. The monostable 174 remains in its triggered state. Thus, the signal on the line 214 remains high and all three of the inputs into the AND-NAND gate 218 are then high Thus the output signal on the line 222 goes high, the output signal on the line 230 goes high, and the diode 234 begins to conduct through winding 154 and center tap 236 to ground. The direction of current is opposite to the previous conduction period and the coupled signal in the winding 152 causes the output pulse to transition from the first state through the second state to the third state. After the monostable times out, the signal on the line 214 goes low again, causing the AND gate 218 output on the line 222 to go low. It should be noted that the NAND gate output of the gate 218 on a line 240 and 242 was high during the first half of the above described sequence (when the TTL input signal on the line 200 was high) and changed to the low level state when the input signal on the line 200 went low again. Thus the output signal on the line 220 of gate 216 went low when the signal on the line 200 went low. This caused diode 232 to be backed biased when diode 234 was conducting.

Thus, it may be seen that the bi-directional coupler of FIG. 6 can receive either a tristate biphase Manchester coded signal or a TTL compatible input signal in quasi-Manchester format and automatically convert the incoming signal to the proper output signal without intervention of any control or clock signal.

Figure 7:
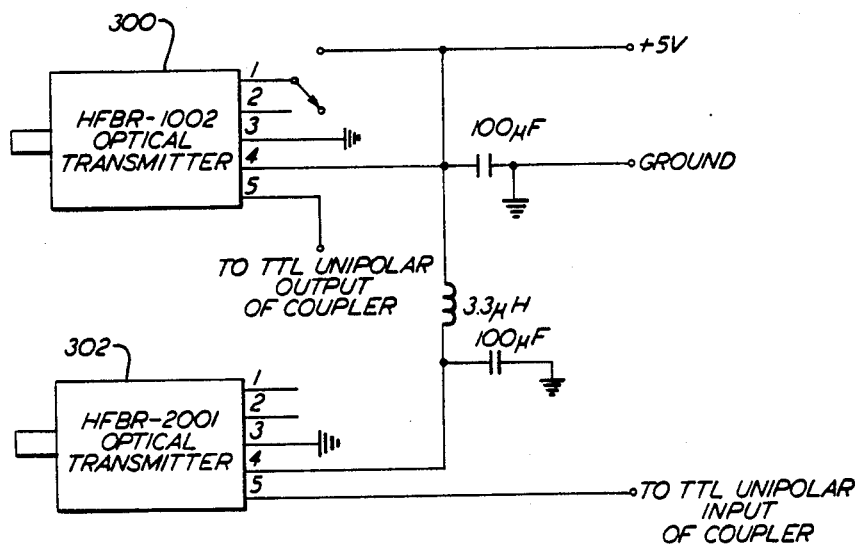
FIG. 7 is a simplified schematic block diagram illustration of a typical interface between the TTL side of the coupler and a commercially available optical transmitter and receiver.

FIG. 7 is an illustration of an optical transmitter 300 manufactured by Hewlett-Packard and and optical receiver 302 also manufactured Hewlett-Packard which may be hooked up in the circuitry as shown to provide an interface between an optical bus and the coupler according to the present invention. Of course it should be understood that the circuit of FIG. 7 is only one of numerous such circuits that could be constructed to provide a convenient way to terminate an optical filter. It is described mainly for purposes of completeness and is in no way limiting as to the coupler of the present invention.

Referring back to FIG. 6, it should be noted that the coupler of the present invention may be configured to respond in the transmit mode to pulses received either at the coupler's tristate bus I/O or at the TTL input for retransmission. This is accomplished by removing the jumper 184 between points "W" 186 and "Yo 188 and installing a new jumper between point "W" 186 and point "X" 400. Thus, pulses received at the TTL input will be retransmitted at the TTL output lines 178.

In addition, the monostable 180 Q output on a line 402 may be used to control an optical transceiver using a single optical fiber for data transfer. The transmit output on the line 402 can thus be used to control the direction of data flow on the fiber by providing a high state when the TTL output is transmitting pulses in response to received Manchester coded pulses at the transformer 150 from the MIL-STD-1553 data bus.

Although the invention has been shown and described with respect to a best mode embodiment thereof, it should be understood by those skilled in the art that the foregoing and various other changes, omissions, and additions in the form and detail thereof maybe made therein without departing from the spirit and scope of this invention.

That which I claim, and desire to secure by letters patent, is:

1. A bi-directional coupler (10) independent of any external timing signals for converting incoming tristate bipolar signals (14) to outgoing unipolar signals (16) and for converting incoming unipolar signals (20) to outgoing tristate bipolar signals (22), comprising:

transmitter means (12), responsive to incoming tristate bipolar signals (14) for converting incoming tristate bipolar signals (14) to outgoing unipolar signals (16), said transmitter means alos being responsive to a transmitter inhibit signal (172) for preventing conversion of said incoming bipolar signals (14) in the presence of said transmitter inhibit signal (172);

transmitter inhibit means (174), responsive to incoming unipolar signals (20) for providing the transmitter inhibit signal (172) in the presence of incoming unipolar signals (20) only if the incoming unipolar signals (20) are received by said coupler (10) before any incoming tristate bipolar signals (14) are received by said coupler;

receiver means (18), responsive to incoming unipolar signals (20) for converting incoming unipolar signals to outgoing tristate bipolar signals (22), said receiver means also being responsive to a receiver inhibit signal (182) for preventing conversion of said incoming unipolar signals (20) in the presence of said receiver inhibit signal; and receiver inhibit means, having a monostable multivibrator (180) responsive to outgoing unipolar signals (16) at a trigger input thereof for providing the receiver inhibit signal (182) at an output thereof in the presence of the outgoing unipolar signals (16) only if the outgoing unipolar signals are transmitted before said coupler (10) receives any incoming unipolar signals (20).

2. The coupler of claim 1, wherein said multivibrator (180) of said receiver inhibit means provides an optical transceiver control signal (402) which is the complement of said receiver inhibit signal (182).

3. A bi-directional coupler (10) independent of any external timing signals for converting incoming tristate bipolar signals (14) to outgoing unipolar signals (16) and for converting incoming unipolar signals (20) to outgoing tristate bipolar signals (22), comprising:

transmitter means (12), responsive to incoming tristate bipolar signals (14) for converting incoming tristate bipolar signals (14) to outgoing unipolar signals (16) said transmitter means also being responsive to a transmitter inhibit signal (172) for preventing conversion of said incoming bipolar signals (14) in the presence of said transmitter inhibit signal (172);

transmitter inhibit means, having a monostable multivibrator (174) responsive to incoming unipolar signals (20) at a trigger input thereof for providing the transmitter inhibit signal (172) at an output thereof in the presence of incoming unipolar signals (20) only if the incoming unipolar signals (20) are received by said coupler (10) before any incoming tristate bipolar signals (14) are received by said coupler;

receiver means (18), responsive to incoming unipolar signals (20) for converting incoming unipolar signals to outgoing tristate bipolar signals (22), said receiver means also being responsive to a receiver inhibit signal (182) for preventing conversion of said incoming unipolar signals (20) in the presence of said receiver inhibit signal; and receiver inhibit means (180), responsive to outgoing unipolar signals (16) for providing the receiver inhibit signal (182) in the presence of the outgoing unipolar signals (16) only if the outgoing unipolar signals are transmitted before said coupler (10) receives any incoming unipolar signals (20).

4. A bi-directional coupler (10) independent of any external timing signals for converting incoming tristate bipolar signals (14) to outgoing unipolar signals (16) and for converting incoming unipolar signals (20) to outgoing tristate bipolar signals (22), comprising:

transmitter means (12), responsive to incoming tristate bipolar signals (14) for converting incoming tristate bipolar signals (14) to outgoing unipolar signals (16), said transmitter means also being responsive to a transmitter inhibit signal (172) for preventing conversion of said incoming bipolar signals (14) in the presence of said transmitter inhibit signal (172);

transmitter inhibit means (174), responsive to incoming unipolar signals (20) for providing the transmitter inhibit signal (172) in the presence of incoming unipolar signals (20) only if the incoming unipolar signals (20) are received by said coupler (10) before any incoming tristate bipolar signals (14) are received by said coupler;

receiver means (18), having first gating means (202), responsive to a receiver inhibit signal (182) and to said incoming unipolar signals (20) for blocking said incoming unipolar signals only in the presence of said receiver inhibit signal and for otherwise providing gated incoming unipolar signals (204), said receiver means (18) also having second gating means (218), responsive to said gated incoming unipolar signals (204) and to an enable signal (214) which enables said second gating means and which is the complement of said transmitter inhibit signal (172), said second gating means providing a first polar half of said outgoing tristate bipolar signals (22), said receiver means (18) also having third gating means (216), responsive to an inverted first polar half (242) of said outgoing tristate bipolar signals and to said enable signal (214) for providing a second polar half (220) of said outgoing tristate bipolar signals (22); and receiver inhibit means (180), responsive to outgoing unipolar signals (16) for providing the receiver inhibit signal (182) in the presence of the outgoing unipolar signals (16) only if the outgoing unipolar signals are transmitted before said coupler (10) receives any incoming unipolar signals (20).

5. The coupler of claim 4, wherein the output of said first gating means (202) is electrically connected to the input of said receiver inhibit means (180) for retransmitting said incoming unipolar signals (20) as outgoing unipolar signals (16).

6. A bi-directional coupler (10) independent of any external timing signals for converting incoming tristate bipolar signals (14) to outgoing unipolar signals (16) and for converting incoming unipolar signals (20) to outgoing tristate bipolar signals (22), comprising:

transmitter means (12), having a clipper circuit (158), responsive to incoming tristate bipolar signals for providing clipped signals (166), said transmitter means (12) also having gating means (168), responsive to said clipped signals (166) and to a transmitter inhibit signal (172) for blocking said clipped signals only in the presence of said transmitter inhibit signal and for otherwise providing said clipped signals as outgoing unipolar signals (16);

transmitter inhibit means (174), responsive to incoming unipolar signals (20) for providing the transmitter inhibit signal (172) in the presence of incoming unipolar signals (20) only if the incoming unipolar signals (20) are received by said coupler (10) before any incoming tristate bipolar signals (14) are received by said coupler;

receiver means (18), responsive to incoming unipolar signals (20) for converting incoming unipolar signals to outgoing tristate bipolar signals, (22), said receiver means also being responsive to a receiver inhibit signal (182) for preventing conversion of said incoming unipolar signals (20) in the presence of said receiver inhibit signal; and receiver inhibit means (180), responsive to outgoing unipolar signals (16) for providing the receiver inhibit signals (182) in the presence of the outgoing unipolar signals (16) only if the outgoing unipolar signals are transmitted before said coupler (10) receives any incoming unipolar signals (20).

* * * * *